Jan. 11, 1966        J. W. COATES        3,228,538
APPARATUS FOR DELIVERING METERED BATCHES OF BISCUITS OR THE
LIKE FROM A COLUMN
Filed Jan. 6, 1964        2 Sheets-Sheet 2
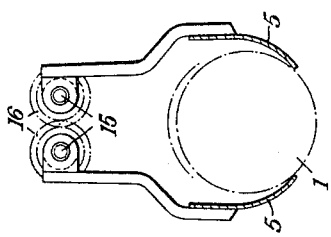
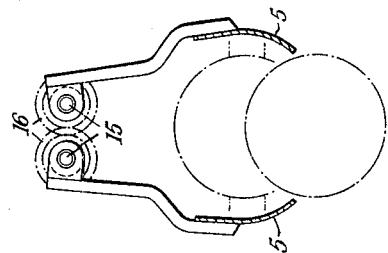
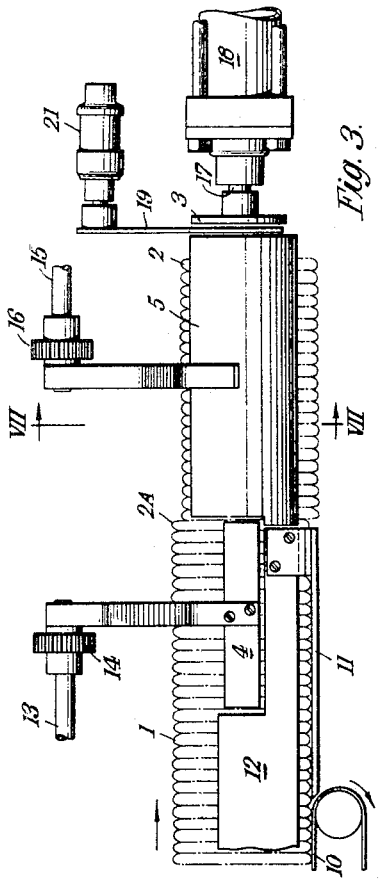
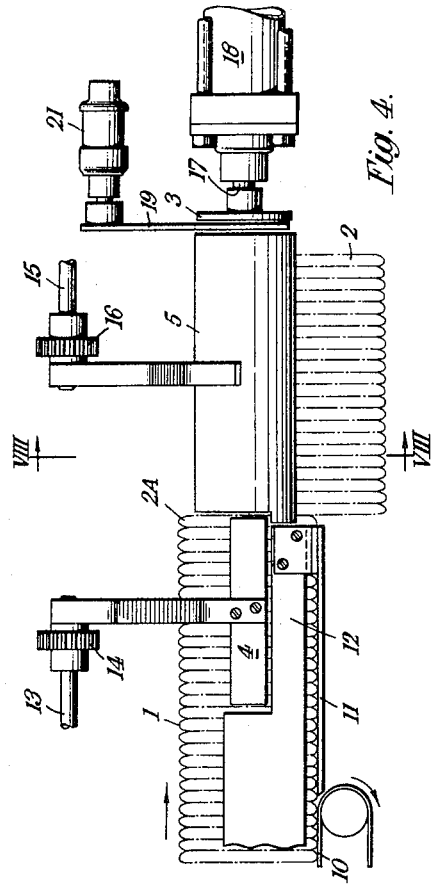
INVENTOR
John Wm. Coates
BY Watson, Cole, Grindle & Watson
ATTORNEYS

United States Patent Office 3,228,538
Patented Jan. 11, 1966

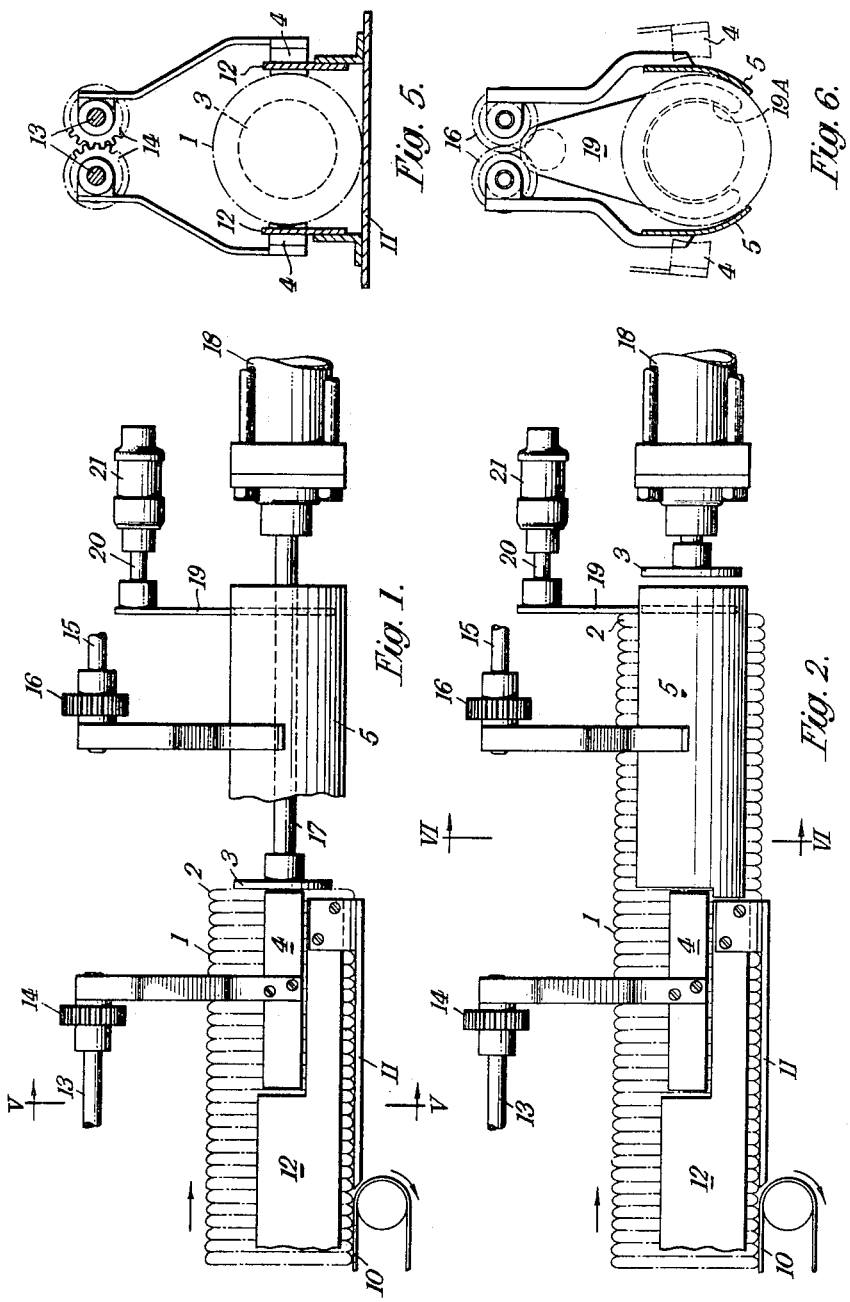

3,228,538
APPARATUS FOR DELIVERING METERED BATCHES OF BISCUITS OR THE LIKE FROM A COLUMN
John William Coates, Leeds, England, assignor to The Forgrove Machinery Company Limited, Leeds, England, a British company
Filed Jan. 6, 1964, Ser. No. 335,970
Claims priority, application Great Britain, Jan. 22, 1963, 2,760/63
5 Claims. (Cl. 214—7)

This invention relates to apparatus for delivering metered batches from the head of a column of biscuits or like thin articles standing on edge on a supporting plate.

The apparatus according to the invention comprises a support for the leading biscuit of the column, means for advancing said support at each cycle of operation and simultaneously feeding the column forward along the supporting plate to cause a batch of biscuits to be fed forward by pressure from behind and with the leading biscuit supported through a definite distance to a position beyond the end of the supporting plate in which the leading biscuit remains supported, guides in advance of the supporting plate disposed on opposite sides of and extending beneath all of the biscuits in the batch so fed forward, a pair of grippers for engaging the biscuits immediately to the rear of the batch, means for opening the grippers to permit advance of the batch and thereafter closing them, means for removing support from the leading biscuit after the grippers have closed to allow the biscuits in advance of the grippers to fall into the guides, means for then separating the guides momentarily to allow the biscuits held in them to fall from them, and means for returning the biscuit support into contact with the leading biscuit remaining in the column before the grippers are opened again.

The biscuit support may be moved mechanically through a forward stroke which determines the length of the batch to be metered, and afterwards given a short further forward stroke to remove support from the biscuits and allow the metered batch of biscuits to drop into the guides.

Alternatively the apparatus may include a removable stop for arresting the leading biscuit during advance of the biscuit support, the biscuit support being arranged to advance beyond the stop and the stop being subsequently removed to allow the metered batch of biscuits to fall into the guides.

Preferably the grippers extend sufficiently beyond the supporting plate to engage a biscuit which is partially supported on the extreme end of the supporting plate.

One embodiment of biscuit delivery apparatus according to the invention will now be described with reference to the accompanying drawings, in which:

FIGS. 1–4 are side elevations, showing successive stages in the operation of separating a batch of biscuits from the column;

FIG. 5 is a section on the line V—V in FIG. 1;

FIG. 6 is a section on the line VI—VI in FIG. 2;

FIG. 7 is a section on the line VII—VII in FIG. 3; and

FIG. 8 is a section on the line VIII—VIII in FIG. 4.

FIG. 1 shows a column of biscuits 1, which has been advanced by a conveyor 10 on to a deadplate 11 provided with side guides 12, at the start of a cycle of operations. Grippers 4 are closed upon the biscuits near the head of the column and a biscuit support 3 is in contact with the leading biscuit 2. The support 3 is mounted on a rod 17 attached to a piston, not shown, in an air cylinder 18. The grippers 4 are mounted on shafts 13 geared together by pinions 14. Adjacent the end of the dead plate 11 is a pair of curbed guides 5, carried by shafts 15 geared together by pinions 16.

The grippers 4 are then opened and the support 3 is moved forward by a definite amount, by the air cylinder 18, to the position of FIG. 2. In moving to the position of FIG. 2, the support 3 passes through a hole 19A in a biscuit relief plate 19 which is mounted on a rod 20 attached to a piston (not shown) in an air cylinder 21. As the support 3 is advanced, the biscuits 1 are fed forward by the conveyor 10 and follow the support 3 until they are arrested by the plate 19, as shown in FIG. 2. In this position the batch of biscuits extending beyond the dead plate is held by pressure against the plate 19 in a position between the guides 5.

The grippers 4 then close again on to the biscuits and the plate 19 is then given a forward movement by the air cylinder 21, as shown in FIG. 3, allowing the batch of biscuits to fall freely into the container formed by the guides 5. It will be noted that the grippers 4 slightly overlap the guides 5 so that they retain the biscuit 2A which projects to some extent beyond the dead plate 11, this biscuit becoming the leading biscuit of the next batch. If the biscuit 2A should have been advanced so far that it is not securely held by the grippers 4, it will fall with the other biscuits in front of it into the receptacle formed by the guides 5.

The guides 5 are then moved apart, as shown in FIG. 4, to allow the batch of biscuits to fall into any suitable receptacle, e.g., a carton or the pocket of an infeed conveyor for carrying the biscuits to a wrapping machine. Thereafter the guides 5 close in again and the plate 19 and the support 3 are returned by the cylinders 21, 18 respectively, to the positions of FIG. 1 ready for the next cycle of operations.

It is not, of course, essential that the dead plate 11 should extend horizontally as shown. It may be inclined upwardly or downwardly from the horizontal. The conveyor 10 may run continuously, slipping beneath the biscuits when they are arrested, or it may be operated intermittently in timed relation with the other parts of the mechanism.

What I claim as my invention and desire to secure by Letters Patent is:

1. Apparatus for delivering metered batches from the head of a column of biscuits or like thin articles standing on edge on a supporting plate, comprising a support for the leading biscuit of the column, means for advancing said support at each cycle of operation and simultaneously feeding the column forwards along the supporting plate to cause a batch of biscuits to be fed forward by pressure from behind and with the leading biscuit supported through a definite distance to a position beyond the end of the supporting plate in which the leading biscuit remains supported, guides in advance of the supporting plate disposed on opposite sides of and extending beneath all of the biscuits in the batch so fed forward, a pair of grippers for engaging the biscuits immediately to the rear of the batch, means for opening the grippers to permit advance of the batch and thereafter closing them, means for removing support from the leading biscuit after the grippers have closed to allow the biscuits in advance of the grippers to fall into the guides, means for then separating the guides momentarily to allow the biscuits held in them to fall from them, and means for returning the biscuit support into contact with the leading biscuit remaining in the column before the grippers are opened again.

2. Apparatus as claimed in claim 1, in which the grippers extend sufficiently beyond the supporting plate to engage a biscuit which is partially supported on the extreme end of the supporting plate.

3. Apparatus as claimed in claim 1, which includes a removable stop for arresting the leading biscuit during advance of the biscuit support and in which the biscuit support is arranged to advance beyond the stop.

4. Apparatus as claimed in claim 3, in which the stop is a biscuit retaining plate provided with a hole for the passage of the biscuit support.

5. Apparatus as claimed in claim 4, which includes air cylinders for respectively advancing and returning the biscuit support and moving the stop into and out of position to support the biscuits.

No references cited.

GERALD M. FORLENZA, *Primary Examiner.*

MORRIS TEMIN, *Examiner.*